UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

REFRACTORY ARTICLE.

1,303,993. Specification of Letters Patent. Patented May 20, 1919.

No Drawing. Application filed July 26, 1918. Serial No. 246,873.

*To all whom it may concern:*

Be it known that I, FRANK J. TONE, a citizen of the United States, residing at Niagara Falls, in the county of Niagara and State of New York, have invented a new and useful Improvement in Refractory Articles, of which the following is a full, clear, and exact description.

My invention relates to refractory articles which contain graphite and sintered magnesia. Graphite has long been used in the making of refractory articles, especially crucibles for the melting of metals. I have discovered that a mixture of graphite, sintered magnesia and a suitable binder, such as clay, produce a crucible of very superior refractory qualities. Such a mixture is very easy to mold and work in the plastic state, and after burning has a body which is very refractory, less oxidizable than the graphite crucible, of superior strength, and of high conductivity and great durability.

As a typical mixture which may be employed for the production of articles embodying my invention, I take graphite 40 parts; sintered magnesia 40 parts; and plastic clay 20 parts; these proportions being by weight. The graphite may be natural flake or Ceylon graphite, or artificial graphite made in the electric furnace. It is preferably crushed material of a fineness that will pass through about a No. 16 mesh. The form of magnesia which I prefer to use is the variety which is obtained by sintering, shrinking or fusing in the electric furnace, the ordinary grade of magnesite used for refractory purposes. This material after calcining contains about 90 per cent. or upward of MgO, with certain impurities such as silica, iron oxid, alumina and lime. When the sintering is accomplished in the electric furnace the shrinkage is more complete than when done in the ordinary types of calcining furnaces but I do not, in my broader claims, limit my invention to the product shrunk in the electric furnace, it only being necessary to bring the material to a sufficiently high temperature to make it substantially inert to the action of clay or other binder which is employed in the making of refractory articles, to give a product of very low shrinkage and highly refractory qualities when heated. After sintering I crush the product so that it will all pass through a screen having 40 meshes to the inch. The clay is preferably a good refractory grade of plastic clay, properly weathered or aged by mechanical means and analyzing about as follows:

| | |
|---|---|
| Ign. loss | 11.00 |
| Silica | 56.00 |
| Alumina | 26.00 |
| Iron oxid | 5.00 |
| Alkalis | 1.50 |

I do not limit myself to this particular clay however, as many clays of varying compositions will act as satisfactory binders. Furthermore, I do not limit myself to any exact size in the crushing of the sintered magnesia or the graphite, and I have found much finer grades of sintered magnesia to give satisfactory results. Nor do I limit myself to any exact proportions. The clay may be varied to obtain more or less refractory compositions, or compositions which soften at different temperatures, depending on the metal to be melted or the use proposed. These materials are mixed with water and thoroughly worked in a pug mill until full plasticity of the mixture is developed. In the making of crucibles the well known form of crucible jigger is employed in the molding operation, in which a plaster mold conforming to the outside dimensions of the crucible is revolved on the head of the jigger. A batch of the mixture is put in the mold and an inside forming tool is brought down within the mold and presses the material against the side of the mold at the same time spinning and working the material and forming it to shape against the walls of the mold as the mold revolves. The crucibles are then removed from the molds, dried and fired in kilns in the usual manner.

In the manufacture of graphite crucibles the graphite particles or flakes have a tendency to aid in forming cleavages or parting planes in the walls of the crucible during the molding operation as the material is worked and spun under the forming tool. The weak spots in the structure may not appear until the crucible is fired, and often not until after it has been in use for some time. I find that the addition of the sintered magnesia avoids this defect, that the mixture coheres much more strongly, and that there is no tendency for it to form slipping planes along which pieces of the crucible might spall off when put into use. On the contrary there is produced a very strong homogeneous structure.

The invention may be applied to many other refractory articles such as mufflers, retorts, bricks, tubes and the like.

The refractory articles produced by my process have many advantages over those produced by clay and graphite alone, especially when employed for the melting of metals which absorb carbon. The crucibles made by this process are specially adapted for the melting of iron and steel; they will withstand sudden changes of temperature very successfully without cracking or spalling. This is a very marked weakness of ordinary graphite crucibles. The heat conductivity of my composition is very high, which means great fuel economy and ease of melting. Sintered magnesia is not subject to oxidization as is graphite and the resistance of the composition to oxidization is therefore relatively high. The tensile strength is greater than that of ordinary graphite articles and it also resists abrasion very successfully.

I do not limit myself to the sole use of clay as a binding material, as other materials will be found of special value in the specific cases.

I claim:

1. A refractory article containing graphite, sintered magnesia and clay.

2. A refractory article containing graphite, sintered magnesia and a binder, the magnesia forming about forty per cent. by weight of the mixture.

3. A refractory article containing graphite, sintered magnesia and a binder, the graphite and magnesia being present in substantially equal parts by weight.

4. A refractory article composed mainly of graphite in granular or flake form, granular magnesia and clay.

In testimony whereof, I have hereunto set my hand.

FRANK J. TONE.